United States Patent [19]
Arney et al.

[11] Patent Number: 5,751,469
[45] Date of Patent: May 12, 1998

[54] METHOD AND APPARATUS FOR AN IMPROVED MICROMECHANICAL MODULATOR

[75] Inventors: Susanne C. Arney, Highland Park; Dennis Stanley Greywall, White House Station; James A. Walker, Howell; Bernard Yurke, Plainfield, all of N.J.

[73] Assignee: Lucent Technologies Inc., Murray Hill, N.J.

[21] Appl. No.: 565,453

[22] Filed: Feb. 1, 1996

[51] Int. Cl.$^6$ .................................................. G02B 26/00
[52] U.S. Cl. ............................................ 359/291; 359/247
[58] Field of Search ................................. 359/290, 291, 359/247, 248

[56] References Cited

U.S. PATENT DOCUMENTS

| | | | |
|---|---|---|---|
| 5,280,173 | 1/1994 | Morse et al. | 250/227.23 |
| 5,500,761 | 3/1996 | Goossen et al. | 359/290 |

OTHER PUBLICATIONS

Ladabaum et al., "Micromachined Ultrasonic Transducers: 11.4 MHz Transmission in air and more," Appl. Phys. Lett. 68(1), pp. 7-9, Jan. 1996.

Spoliansky et al., "Micromachined Ultrasonic Air–Transducers," Microelectric Eng. v.30, pp. 535-538, 1996.

*Primary Examiner*—Georgia Y. Epps
*Assistant Examiner*—Dawn-Marie Bey

[57] ABSTRACT

An improved modulator and methods for making the modulator are disclosed. A membrane, preferably circular in shape, is formed over a region of a substrate in such a way that a gap results between the membrane and substrate forming a modulator cavity. The membrane forms a continuous surface over the cavity. In particular, the membrane is not supported by discrete support arms, but rather extends beyond the modulator cavity. Preferably, holes are formed in the membrane to aid in damping its motion and to allow access to underlying layers during modulator formation. According to the method, the modulator is formed by forming a means for creating a gap between the substrate and the membrane, forming a membrane, forming a lateral conduit to aid in removing the means for creating the gap and, finally, by removing the means for creating the gap.

12 Claims, 12 Drawing Sheets

METHOD AND APPARATUS FOR AN IMPROVED MICROMECHANICAL MODULATOR

CROSS-REFERENCE TO RELATED APPLICATIONS

This application is related to U.S. patent applications Ser. No. 08/187,676 filed Jan. 27, 1994, now U.S. Pat. No. 5,500,761; Ser. No. 08/283,106 filed Jul. 29, 1994, now U.S. Pat. No. 5,636,502; Ser. No. 08/478,590 filed Jun. 7, 1995, now U.S. Pat. No. 5,654,819; Ser. No. 08/479,476 filed Jun. 7, 1995, now U.S. Pat. No. 5,589,974; Ser. No. 08/578,123 filed Dec. 26, 1995, all of which are assigned to the assignee of the present invention.

FIELD OF THE INVENTION

The present invention relates to micromechanical optical modulators. More particularly, the present invention relates to a micromechanical optical modulator utilizing a circularly-shaped membrane.

BACKGROUND OF THE INVENTION

It is desirable in optical wavelength-division-multiplexing networks to have inexpensive optical modulators that have high contrast and wide optical bandwidths. One potentially suitable optical modulator is the surface-normal micromechanical optical modulator. This device has a variable air gap defined by two layers of material, typically a membrane and a substrate. Varying the air gap by causing the membrane to move alters the optical properties of the device. Typically, such modulators have two states corresponding to two different membrane positions. In one state, a minimal portion of the optical energy incident upon the modulator is returned in the surface normal direction. In the second state, a significantly greater portion of the incident optical energy is so directed. The aforementioned modulator is typically actuated, i.e., the air gap is changed, by electrostatic forces.

Typical prior art modulators utilize uniformly-thick membranes having a rectangularly-shaped central region supported over a substrate via support arms. See, for example, Aratani et al., "Process and Design Considerations for Surface Micromachined Beams for a Tunable Interferometer Array in Silicon," Proc. IEEE Micro. ElectroMech. Workshop, Ft. Lauderdale, Fla., Feb. 7-10, 1993, pp. 230-235. The foregoing reference, as well as any other articles, patent applications or patents mentioned in this specification are incorporated herein by reference.

The support arms of the aforementioned modulators are usually also rectangular in shape and relatively narrow compared to the portion of the membrane they are supporting. Due to the sharp corners resulting from the rectangular shapes of the central region and support arms, and to the relatively narrow support arms, very high stresses can be concentrated in the support arms. Such stresses may cause the support arms to fail rendering the modulator inoperable.

Thus, there is a need for an improved membrane design that minimizes stress concentrations leading to improved modulator reliability and performance and that further simplifies modulator fabrication and packaging.

SUMMARY OF THE INVENTION

An improved micromechanical modulator utilizing a novel membrane configuration, and methods for fabricating the modulator, are disclosed. In one embodiment, a membrane, preferably circular in shape, is formed over a region of a substrate in such a way that a gap results between the membrane and substrate forming a cavity. The membrane forms a continuous surface over the cavity. In particular, the membrane is not supported by discrete support arms, but rather extends beyond the perimeter of the cavity. Thus, the membrane covers the cavity in a manner analogous to the way a drum head covers the body of a drum. Preferably, holes are formed in the membrane to aid in damping its motion. Also, the holes are used during modulator fabrication, as described below.

Modulators according to the present invention may be formed using known deposition and patterning techniques. In one embodiment, at least one layer of material is deposited on a silicon substrate and patterned, defining a preferably circular region of bare substrate where the gap will be formed, i.e., defining the modulator cavity. The nascent modulator is exposed to conditions suitable for thermally oxidizing the bare substrate within the circular region. The oxidation conditions are controlled to precisely limit the lateral and vertical extent of the oxidation within the substrate. In this manner, the thickness of the resulting gap and the dimensions of the modulator cavity can be precisely defined.

A rapidly-etchable layer of material is deposited on the oxidized silicon. Such a material is capable of being etched at a much faster rate than the underlying oxide. The rapidly-etchable layer is patterned into the shape selected for the membrane and then a membrane-forming layer of material is deposited and patterned, preferably into a circular shape.

During membrane patterning, small holes are formed that extend completely through the membrane. As mentioned above, such holes aid in damping membrane vibration and also provide access to the underlying layers, such as the rapidly-etchable layer and the oxidized silicon, that must be removed in subsequent steps to form the gap. No holes are placed in a region near the center of the membrane which forms an optical window. If the membrane is non-conductive, a layer of conductive material is deposited on the membrane, leaving the optical window uncovered.

An etch is then introduced through the holes in the membrane. The etch first removes the rapidly-etchable layer. Once removed, a lateral conduit exists between the oxide layer and the membrane layer that allows the etch to flow over the entire surface of the oxide layer. After flowing over the surface of the oxide, the etch proceeds in an essentially vertical direction through the oxide. Providing a lateral conduit for this purpose is particularly advantageous. If the rapidly-etchable layer was not present so that a conduit was not formed, the etch would have to proceed in a somewhat lateral direction under the regions of the membrane where there are no holes, such as the optical window. Since the oxidized substrate may be as much as 350 microns in diameter, i.e., the size of the modulator cavity, yet typically about a micron or less in thickness, a vertical etch will be completed much more rapidly than a lateral etch. Such a rapid etch is desirable since membrane features are susceptible to attack while the underlying oxide is being etched. Removing the oxide layer creates the gap hence forming the modulator.

BRIEF DESCRIPTION OF THE DRAWINGS

Further features of the invention will become more apparent from the following detailed description of specific embodiments thereof when read in conjunction with the accompanying drawings, in which like elements have like reference numerals and in which:

FIG. 10 shows a rapidly-etchable layer disposed on the arrangement of FIG. 9a;

DETAILED DESCRIPTION OF THE PREFERRED EMBODIMENT

Figure 1:
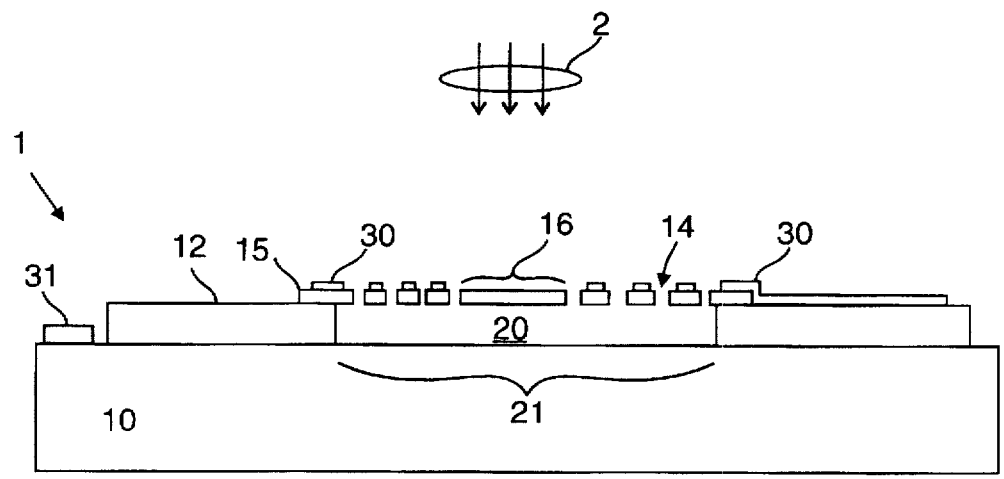
FIG. 1 is a cross-sectional side view of a modulator according to the present invention.
Figure 2:
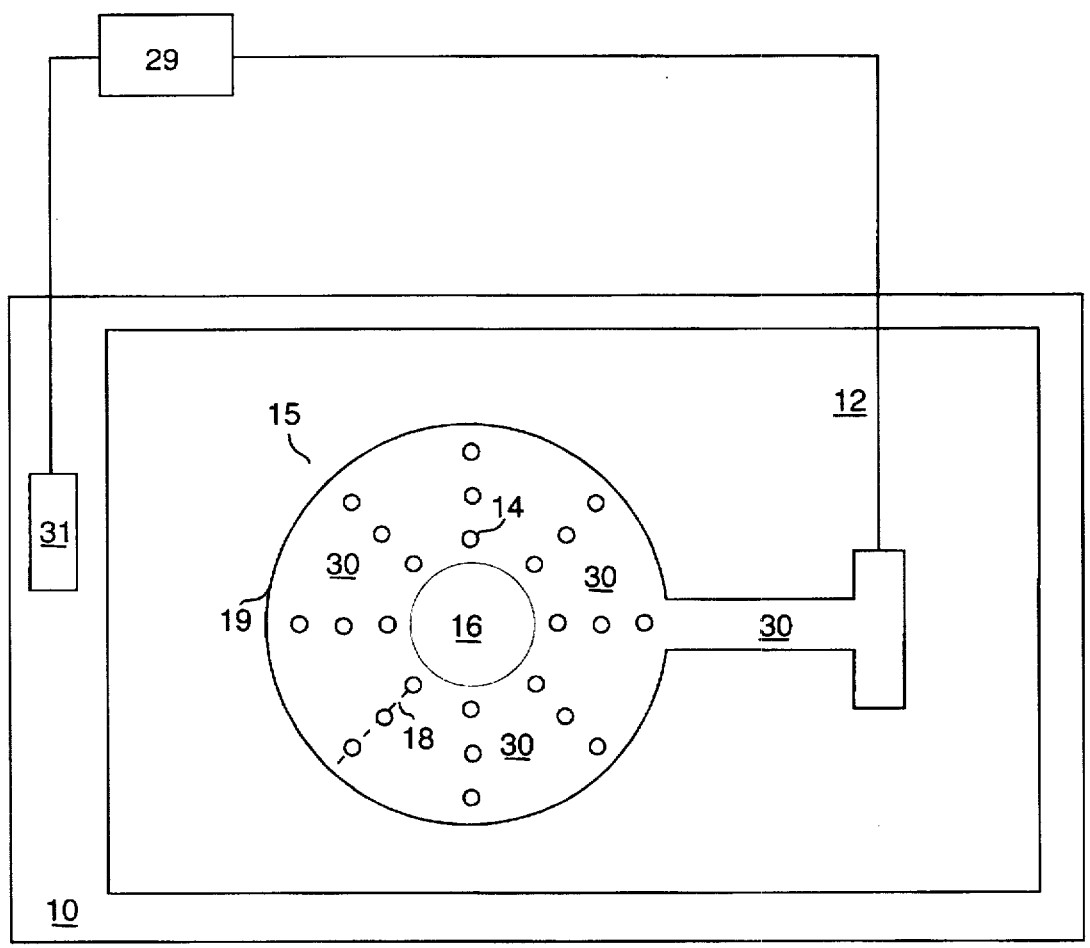
FIG. 2 is a top view of the modulator of FIG. 1.

FIGS. 1 and 2 show a preferred embodiment of a micromechanical modulator 1 according to the present invention. As shown in FIG. 1, the device comprises a substrate 10 and membrane 15.

The membrane 15 and substrate 10 are spaced from each other defining a gap 20 between them. In a preferred embodiment, a plurality of holes 14 are provided in the membrane, preferably radially arranged as illustrated in FIG. 2. The holes 14 aid in damping membrane vibration and are also used during modulator fabrication, as described later in this specification. The holes 14 are patterned in the membrane 15 beginning outside of a centrally located region 16 and radiate toward the periphery 19 of the membrane 15. The centrally located region 16 forms an "optical window". The optical window is typically in optical communication with an optical waveguide or fiber that delivers an optical signal 2 to the modulator. The holes 14 are absent from the optical window since their presence in that region of the membrane would deleteriously effect the optical properties of the modulator 1.

In contrast to typical modulator designs, the present modulator is not supported by discrete support arms. Rather, the membrane 15 overlaps the periphery of the modulator cavity 21 along most of such periphery. In a preferred embodiment, the membrane 15 overlaps the periphery of the modulator cavity 21 at substantially every point along such periphery. Such an arrangement reduces the concentration of stress which may develop in the narrow support arms and near sharp corners. High-stress points may act as nucleation sites for fractures. Such fractures may result in modulator failure.

In a preferred embodiment, the membrane 15 is circular, as shown in FIG. 2. Such a circular membrane has neither of the aforementioned stress concentrators and may be fabricated to have a higher intrinsic stress level than would otherwise be possible. Modulators using such a higher-stress membrane will have a higher resonant frequency and a higher bit rate than modulators utilizing a lower-stress membrane.

Figure 3:
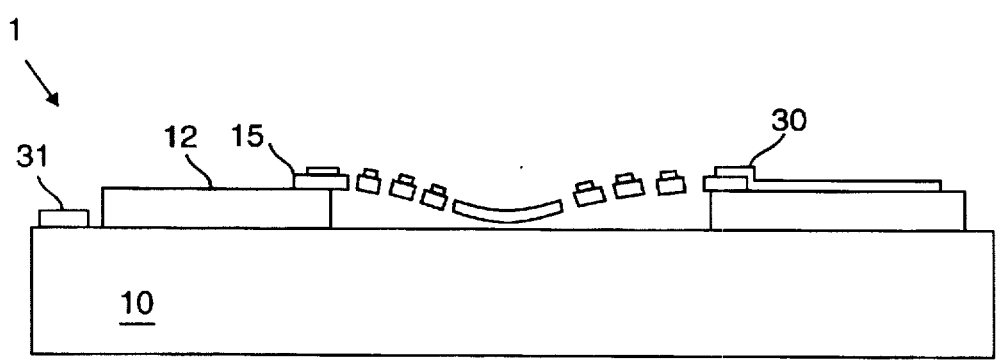
FIG. 3 illustrates the modulator of FIGS. 1 and 2 under bias.

The substrate 10 and the membrane 15 are preferably suitably conductive so that a biasing signal may be applied across them generating an electrostatic force. This force causes the membrane 15 to move toward the substrate, as shown in FIG. 3. As the membrane moves from its unbiased position, the reflectivity of the modulator 1 to the incident optical signal 2 changes. In particular, in a first embodiment, the modulator 1 exhibits its minimum reflectivity when the membrane is in its unbiased position. The minimum reflectivity of the modulator is preferably zero. As the membrane moves to its biased position, the modulator preferably exhibits its maximum reflectivity. In a second embodiment, the modulator 1 exhibits its maximum reflectivity when the membrane is in its unbiased position. As the membrane moves to its biased position, the modulator preferably exhibits its minimum reflectivity. Minimum reflectivity for the second embodiment is again preferably zero.

The biasing signal can be supplied by a controlled voltage source 29. A contact 31 may be formed on the substrate 10 to facilitate electrical connection with the controlled voltage source 29. The controlled voltage source is also electrically connected to the membrane 15. The modulator may suitably be formed on a semiconductor chip or wafer.

Preferably, the substrate 10 is formed of a conductive material, which is either transparent or absorbing over the operating optical bandwidth. Suitable materials include, but are not limited to, silicon, gallium arsenide, indium phosphide, germanium or indium tin oxide (ITO) coated glass. If a semiconductor is used for the substrate, it should preferably be appropriately doped. For example, if the substrate is silicon, it is preferably doped with any Group III or Group V element, typically phosphorous or boron. Such doping should enhance device speed.

If the substrate is formed of a material that is insufficiently conductive for a modulator according to the present invention, conductivity can be increased or imparted by doping the substrate with suitable materials. Doping methods include ion implantation, selective diffusion and other methods known to those skilled in the art.

The membrane 15 is preferably comprised of a single layer of material which is transparent at the operating wavelengths of the modulator. If the substrate 10 is silicon, which is the preferred material, then the membrane 15 is preferably silicon nitride. It should be understood that the improved modulator of the present invention may be based on any one of a variety of different operating principles. As such, the preferred or required characteristics of the membrane of the present modulator may vary as a function of the selected operating principle. For example, if the present modulator comprises at least one quarter-wave thick membrane according to the teachings of U.S. Pat. Nos. 5,500,761; 5,636,502; 5,654,819 and 5,589,974, then the membrane 15 is further characterized by a refractive index which is approximately equal to the square root of the refractive index of the substrate 10. If, however, the modulator is a phase-mismatched Fabry-Perot cavity modulator as described in U.S. patent application Ser. No. 08/578,123, then the membrane 15 is characterized by a refractive index which is greater than the square root of the refractive index of the substrate 10. It will be appreciated that the membrane 15 according to the present invention may be required to possess other characteristics for other modulator designs. Such differences not withstanding, all embodiments of modulators according to the present invention will have a membrane that overlaps the periphery of the modulator cavity. In some preferred embodiments, such a membrane may have a circular shape and may additionally possess damping holes.

As previously noted, if the membrane 15 is not suitably conductive for a modulator according to the present invention, a layer 30 of conductive material may be deposited on it, as shown in FIGS. 1, 2 and 3. It should be appreciated that if the membrane 15 is comprised of a suitably conductive material, such as doped amorphous or polycrystalline silicon or ITO, then the conductive layer 30 is not required. Any suitably conductive material may be used to form the conductive layer 30, including, without limitation, aluminum, platinum, tungsten, conducting silicon, ITO, gold, or alloys of these materials such as, without limitation, chromium/gold or titanium/gold. Further, silicides or appropriately-doped amorphous silicon or polycrystalline silicon is suitable for use as the conductive layer. It will be appreciated that if the conductive layer 30 is optically opaque over the operating bandwidth of the modulator, then it must not be disposed on the centrally located region 16 of the membrane 15 that forms the optical window.

As previously noted, an improved modulator according to the present invention can be based on any one of a variety of operating principles. As such, the thickness of the membrane 15 and the size of the gap 20 may vary with the selected operating principle. Such parameters can be determined by referencing a description of a modulator based on the selected operating principle. See, for example, U.S. Pat. Nos. 5,500,761; 5,636,502; 5,654,819; 5,589,974 and U.S. patent application Ser. No. 08/578,123.

As previously described, the membrane 15 includes a plurality of holes 14. In the embodiment shown in FIG. 2, the holes 14 are aligned along a plurality of radii 18. In a preferred embodiment, the holes should be arranged along a square or hexagonal array. The holes are sized and spaced to optimize damping of the membrane 15.

Maximum damping is achieved when the distance, d, between holes 14 is given by:

$$d = 2[(Ph^2)/(12\pi \mu_{ef} f)]^{0.5} \qquad [1]$$

where: P is the pressure of the gas through which the membrane 15 moves; h is the distance between the membrane and the substrate, i.e., the gap 20, f is the natural resonant frequency of the modulator and $\mu_{ef}$ is the effective gas viscosity. The effective gas viscosity may be expressed in terms of the gas viscosity $\mu$ by the formula:

$$\mu_{ef} = \mu / \{1 + [6(2-\sigma)\lambda/\sigma h]\} \qquad [2]$$

where: $\sigma$ is the accommodation coefficient, as described further below, and $\lambda$ is the mean-free-path of the gas. The following example uses the foregoing expressions to calculate the spacing, d, for holes 14 in a membrane 15.

In the following example, the gas surrounding the modulator is assumed to be air at a temperature of 20° C. and at a pressure of one atmosphere. Further, the modulator is designed for an operating frequency of 1 MHz and has a gap between the membrane and substrate of 1 micron. The accommodation coefficient, $\sigma$, is a measure of how effectively a surface scatters gas molecules that impinge the surface. The accomodation coefficient typically has a value near 1, which will be the value used for the present example. At the prevailing temperature and pressure conditions, the mean-free-path, $\lambda$, of air is 0.09 microns and the viscosity, $\mu$, of air is $1.8 \times 10^{-4}$ grams per centimeter second. Substituting the foregoing values into [2], $\mu_{ef}$ equals $1.2 \times 10^{-4}$ grams per centimeter second. The pressure, P, is $1 \times 10^6$ dynes per square centimeter and frequency is $1 \times 10^6$ Hertz. Substituting the foregoing values into [1], d equals 28 microns.

The diameter of the holes 14 should be in the range of about 2 to about 4 times the gap between the membrane and substrate, i.e, about 2h to about 4h, and no more than about one-third of d, the hole spacing. Thus, for the foregoing example, a suitable hole diameter may range from about 2 microns to about 4 microns.

Expression [1] provides the hole spacing for maximum membrane damping. Depending upon the specifics of a given application, a maximally-damped membrane might not, however, be an optimally-damped membrane. It is possible, for example, that a calculated hole spacing and hole size may result in an over-damped membrane 15. Damping is optimized at a quality factor, Q, in the range of about 0.7 to 0.8, which allows the modulator to achieve the highest bit rates. The quality factor, which may be calculated in ways known to those skilled in the art, is inversely proportional to the damping of the membrane. Thus, as damping increases, Q decreases proportionally. The damping can be reduced by decreasing the number of holes 14 in the membrane 15. In particular, the holes should be reduced in proportion to the desired increase in Q.

It will be appreciated from expression [1] that the type of gas used in the modulator cavity and its pressure also affect membrane damping. Generally, heavier gases provide more damping than lighter gases, e.g., xenon provides more damping then helium. Thus, damping can be adjusted by adjusting gas pressure or changing the type of gas used in the modulator cavity. The resonant frequency, f, of a circular membrane can be determined by the following expression: $f=0.766/D(S/p)^{1/2}$, where S is the stress in the membrane, p is the average density of the membrane and D is the diameter of the membrane, and hence the diameter of the modulator cavity, such as the modulator cavity 21. In calculating the stress, S, and density, p, of the membrane, the presence of the conductive layer 30 and any other layers should be taken into account. With optimal damping, the modulator bit rate is about twice the resonant frequency of the membrane 15.

The above expression can be used to size the membrane 15 or modulator cavity 21 for a modulator operating at a given bit rate by simply selecting a membrane material, calculating the membrane's density and stress and then solving for D. For example, the diameter of a membrane according to the present invention is given below as a function of membrane resonant frequency based on a silicon nitride membrane having a stress, S, of 600 Megapascals (MPa) and a density, p, of 3.1 grams per cubic centimeter (gms/cc).

| f (MHz) | D (microns) |
|---|---|
| 1.0 | 336 |
| 1.5 | 224 |
| 2.0 | 168 |
| 2.5 | 134 |
| 3.0 | 112 |

The diameter of the optical window 16 can suitably range in size from about 10 to 150 microns, consistent with the size of the membrane 15. Preferably, the optical window 16 is sized to facilitate optical communication with an optical fiber delivering the optical signal to, and receiving the optical signal from, the modulator. Preferably, the maximum diameter of the optical window 16 is about 35 percent of the membrane diameter. Thus, for the above example, a 3 MHz (6 Mbit/sec) modulator could be made with a 40 micron diameter optical window. If higher-stress silicon nitride is used than in the above example, an even larger optical window could be accomodated, simplifying further the alignment with an optical fiber.

A method according to the present invention for forming the modulator described herein is described below. The method comprises (1) forming a means for creating a gap between the substrate and the membrane, (2) forming a membrane, (3) forming a lateral conduit to aid in removing the means for creating the gap and, finally, (4) removing the means for creating the gap. While steps (3) and (4) occur, for the most part, sequentially, both steps may be accomplished by the single step of delivering an etch to the nascent modulator. Further details of embodiments of the method are described below.

Figure 4:
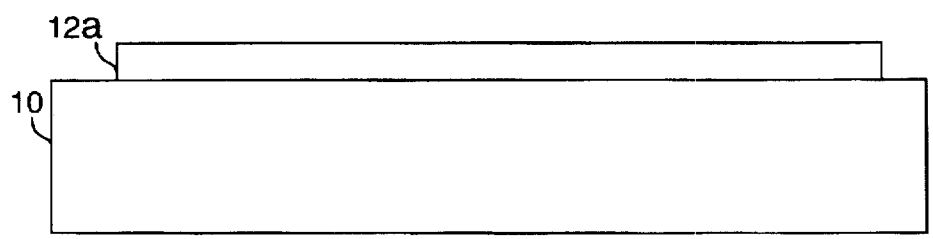
FIG. 4 shows a substrate with a cavity-defining layer disposed thereon.

The substrate 10, which may be in the form of a wafer, is assumed to be silicon for the purposes of the following description. The substrate 10 is assumed to be suitably prepared, i.e. doped, as appropriate, with phosphorus or boron, and cleaned. In one embodiment, a cavity defining layer 12a of material is deposited on the substrate 10, as shown in FIG. 4. The layer 12a will be assumed to be silicon nitride for the purposes of the following description. It will be appreciated by those skilled in the art that to the extent a different material is used for the layer 12a, the following procedures may require modification, such as, for example, using a different etch. Such modifications are within the capabilities of those skilled in the art.

Preferably, the layer 12a of silicon nitride is deposited using low pressure chemical vapor deposition (LPCVD). LPCVD is well known to those skilled in the art. The silicon nitride is deposited at temperatures ranging from about 800° to 840° centigrade (C.). The silicon nitride so deposited has a tensile stress of about 1000 MPa. The layer 12a is typically deposited to a thickness of about 1000 to 1500 angstroms (Å). After deposition, the layer 12a is patterned into the shape of the optical cavity, such as the optical cavity 21.

Figure 5:
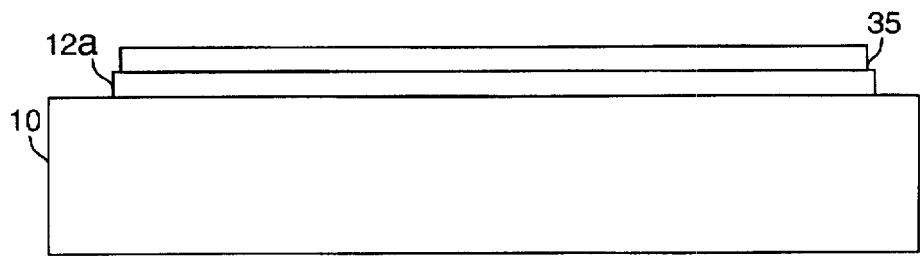
FIG. 5 shows a layer of erodible material disposed upon the arrangement of FIG. 4.
Figure 6:
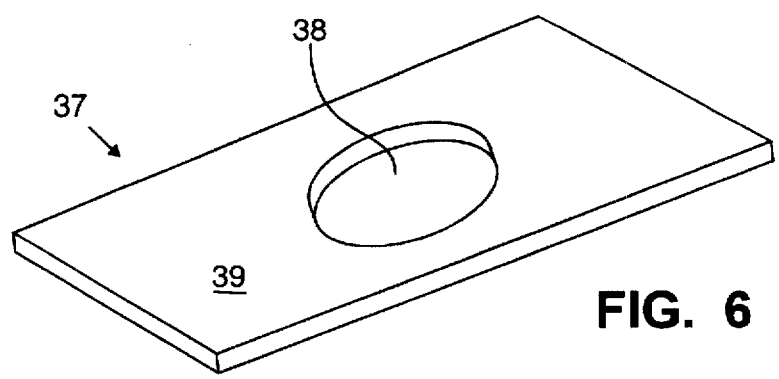
FIG. 6 is an exemplary embodiment of a mask used for patterning a circular feature in a layer of material.

Standard photolithographic techniques may be used to pattern the layer 12a, which are illustrated in FIGS. 5–8. As shown in FIG. 5, a layer 35 of selectively erodible material such as photoresist or photo-definable polyimide, for example, is deposited on the layer 12a. Exposing the layer 35 to appropriate radiation, typically ultraviolet light, causes a change in the solubility of the exposed region of the layer. Exposure may increase or decrease solubility depending upon the nature of the erodible material. After exposure, the erodible material is "developed" wherein it is treated with a solvent that removes erodible material of higher solubility. An appropriately patterned mask, such as the mask 37 shown in FIG. 6, is used so that regions of the layer 35 may be selectively exposed. Such selective exposure allows the pattern of the mask to be reproduced in underlying layers forming desired features in those layers. For example, the mask 37 has a circular region 38 that is either transparent or opaque to such radiation, and a region 39 that has the opposite property, depending upon the nature of the erodible material. As the layer 35 is selectively irradiated through the mask 37, a circular region of the layer 35 having higher solubility than the surrounding region results. Solvent is then applied to remove the higher solubility material, and a circular region extending through the layer 35 and stopping at the layer 12a results. The patterned layer 35 may now serve as a template for patterning the layer 12a.

Figure 7:
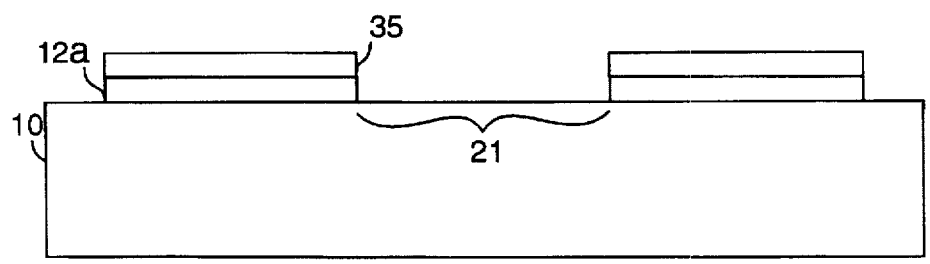
FIG. 7 shows the layers of FIG. 5 patterned to define a modulator cavity.

The layer 12a is etched using an appropriate etching technique. For example, if the layer 12a is silicon nitride, it can be etched using a dry etch such as plasma ion etching or reactive ion etching utilizing fluorine chemistry such as $CF_4$, $CHF_3$ or $SF_6$, for example. Other suitable etching methods known to those skilled in the art may alternatively be used. The nascent modulator, after etching the layer 12a, is shown in FIG. 7. Etching the layer 12a defines the modulator cavity 21. For clarity, prior to patterning, modulator-forming layers will be given the designation "a" as well as a numerical identifier, e.g., the layer 12a. After patterning, the designation "a" will be dropped, e.g., the layer 12.

Figure 8:
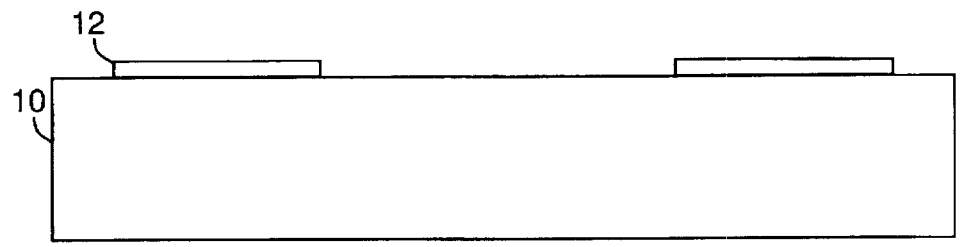
FIG. 8 shows the arrangement of FIG. 7 after the erodible material is stripped from the cavity-defining layer.

The remaining erodible material 35 is stripped from the patterned layer 12 using solvents or a mixture of sulfuric acid and peroxide ("piranha") or plasma ash. FIG. 8 is an illustration of the nascent modulator with the erodible material 35 removed from the cavity defining layer 12. For convenience, the aforementioned steps of depositing an erodible material, patterning, developing, etching and stripping will be collectively referred to herein as "patterning".

The silicon substrate and the cavity defining layer 12 are then thermally oxidized using either steam, wet or dry methods known to those skilled in the art. Preferably, steam oxidation is used. Oxidation temperature is preferably within the range of about 950° to about 1150° C. The lateral extent of the oxidation is defined by the opening in the layer 12, which further defines the modulator cavity 21. The vertical extent of the oxidation is a function of the amount of time that the silicon is exposed to the oxidation environment. The aforementioned method for oxidizing a selective portion of silicon is referred to as local oxidation of silicon (LOCOS). LOCOS is well understood by those skilled in the art.

Figure 9A:
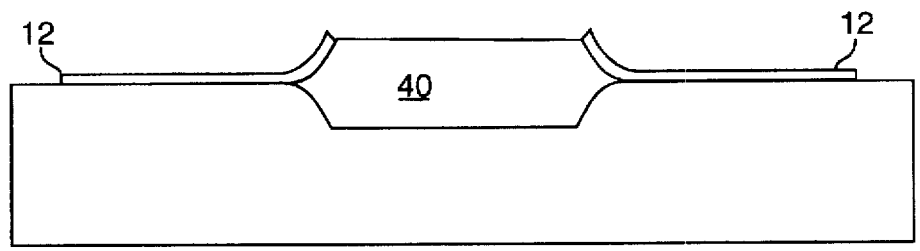
FIG. 9a shows the arrangement of FIG. 8 after local oxidation of the substrate within the nascent modulator cavity.
Figure 9B:
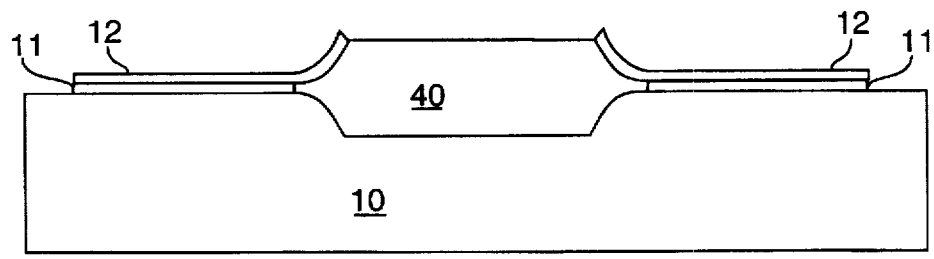
FIG. 9b illustrates a further embodiment of the present method wherein a pad oxide is used to minimize stress on the cavity-defining layer during oxide growth.
Figure 10:
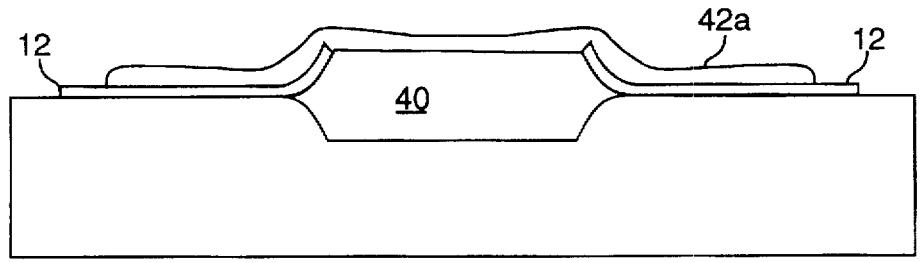

A volumetric expansion occurs as oxygen combines with silicon. As a result, approximately one-half of the LOCOS oxide 40 grows above the original silicon surface as shown in FIG. 9a. Furthermore, the oxidation proceeds somewhat beyond the modulator cavity 21 resulting in the characteristic "bird's beak" shape at each end of the LOCOS oxide 40. As shown in FIG. 9a, the LOCOS oxide lifts a small portion of the cavity defining layer 12. A layer 11 of oxide shown in FIG. 9b, referred to as a "pad oxide," may be used for stress relief as the LOCOS oxide 40 forces itself laterally under the cavity defining layer 12. The pad oxide 11 is believed to flow under the layer 12 as the LOCOS oxide 40 intrudes. If the pad oxide 11 is present, it is deposited or grown before depositing the layer 12a. The thickness of the LOCOS oxide 40 is the primary determinant of the size of the gap 20 when the membrane 15 is in the unbiased state. Thus, a gap determining layer or means for creating a gap between the substrate and membrane is formed.

After the LOCOS oxide 40 is grown to the appropriate thickness, a rapidly-etchable layer 42a is deposited. The layer 42a is formed of a material that etches very rapidly compared to the LOCOS oxide 40. In a preferred embodiment, the material is a glass that etches very quickly in hydrofluoric acid (HF) or buffered HF (BHF) or diluted HF or diluted BHF. Suitable glasses include phosphorosilicate glass (PSG), boron-phosphoro-silicate glass (BPSG), phosphoro-tetraorthosilicate (PTEOS) or boron-phosphoro-tetraorthosIlicate (BPTEOS). Plasma-enhanced chemical vapor deposition silicon nitride or silicon oxide, and spin-on-glass may also suitably be used as the rapidly-etchable layer. In an alternate preferred embodiment, discussed in more detail later in this specification, the rapidly-etchable layer may be amorphous silicon or polycrystalline silicon. Regardless of the material chosen, the layer 42a is preferably deposited as a smooth layer having a uniform thickness.

If the layer 42a is a glass, it is preferably deposited at low temperatures using LPCVD. Deposition temperature is preferably about 450° C. The layer 42a is preferably deposited to a thickness ranging from about 500 to about 5000 Å. Then it may be annealed to control its density and etching properties, at, for example, 900° C. for 1 hr in nitrogen. After deposition, the layer 42a is patterned using the standard photolithographic steps previously described.

Figure 11:
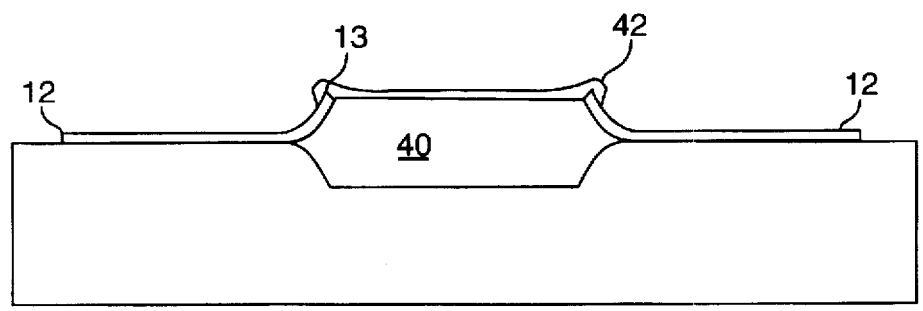
FIG. 11 shows the rapidly-etchable layer patterned.

As shown in FIG. 11, the patterned rapidly-etchable layer 42 preferably slightly oversizes the upturned edge 13 of the cavity-defining layer 12. Alternatively, the patterned rapidly-etchable layer 42 may slightly undersize the edge 13 so that the upper surface of the LOCOS oxide 40 is not completely covered. Depositing the rapidly-etchable layer 42a facilitates forming a lateral conduit 43 for distributing etch solution across the surface of the underlying LOCOS oxide, as described in more detail below. Such a feature is particularly advantageous.

Figure 12:
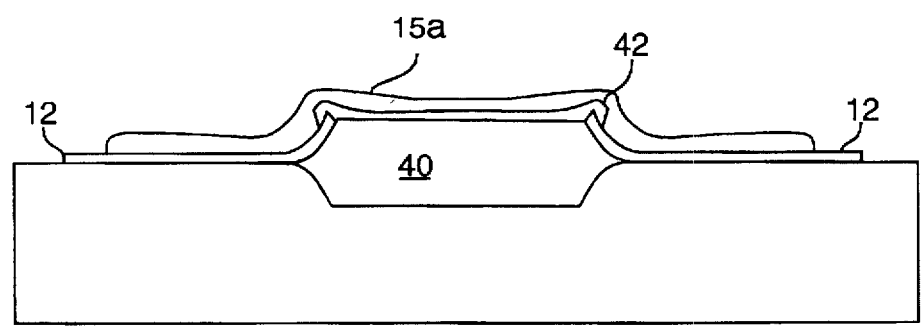
FIG. 12 shows the membrane-forming layer disposed on the arrangement of FIG. 11.

A membrane-forming layer 15a is next deposited as shown in FIG. 12. Preferably, the membrane-forming layer 15a is silicon nitride that is deposited using LPCVD. The membrane forming layer 15a is deposited to the thickness required for membrane 15. As previously noted, membrane thickness can be determined according to the teachings of the aforementioned patent specifications or according to other references as appropriate for the selected operating principle of the modulator. Further, the refractive index and stress of the membrane forming layer 15a are controlled. It is within the capabilities of those skilled in the art to suitably control the aforementioned parameters.

Figure 13:
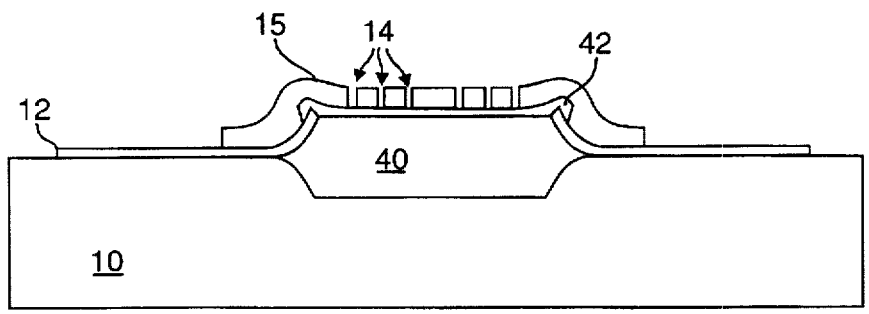
FIG. 13 is an illustration of the arrangement of FIG. 12 with the membrane-forming layer patterned into a membrane.
Figure 14:
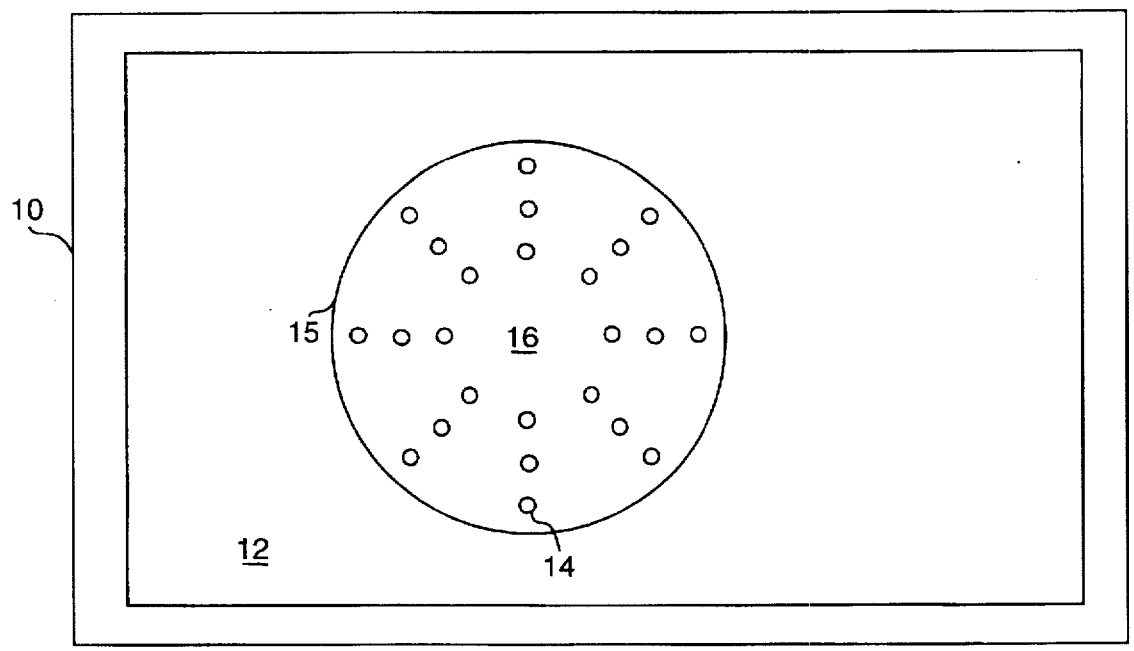
FIG. 14 is a top-view of the arrangement of FIG. 13.
Figure 15:
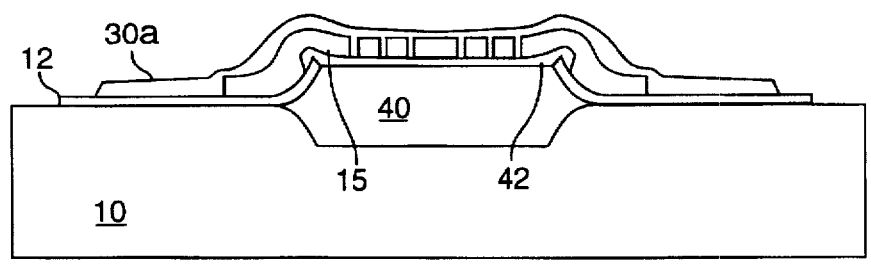
FIG. 15 shows a layer of conductive material disposed on top of the membrane.

The membrane-forming layer 15a is preferably patterned into the membrane 15 using standard photolithographic procedures. The plurality of holes 14, shown in FIGS. 13 and 14, are patterned in the membrane 15 during the aforementioned step. Note that the membrane-forming layer 15a need not be removed "in the field", i.e., beyond the modulator cavity 21. A layer 30a of conductive material, shown in FIG. 15, is deposited, if required, on the patterned membrane 15. The layer 30a is then patterned. Alternatively, the layer 30a can be deposited before patterning the underlying membrane-forming layer 15a. In a further preferred embodiment, the layer 30a can be deposited and patterned after the release etch step, described below.

Figure 16:
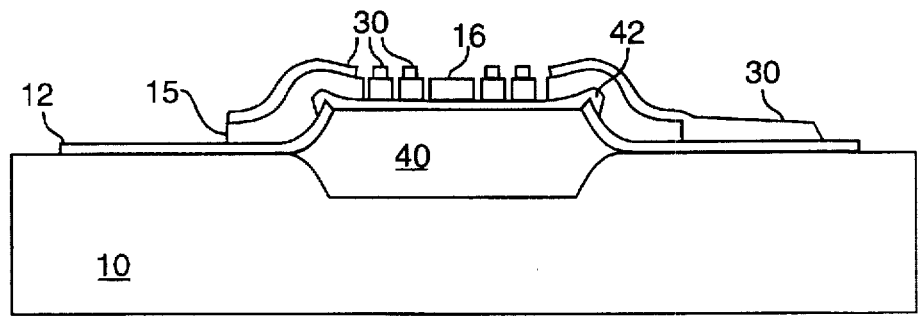
FIG. 16 shows the conductive material appropriately patterned.

As shown in FIG. 16, the conductive material preferably undersizes the membrane 15 so that portions of the membrane 15 adjacent the holes 14 are not covered by the conductive layer 30. If the conductive material is optically opaque, it should not be deposited within the optical window of the membrane 15. Those skilled in the art will appreciate that the layer 30 can be directly patterned using the "liftoff" method.

Figure 17:
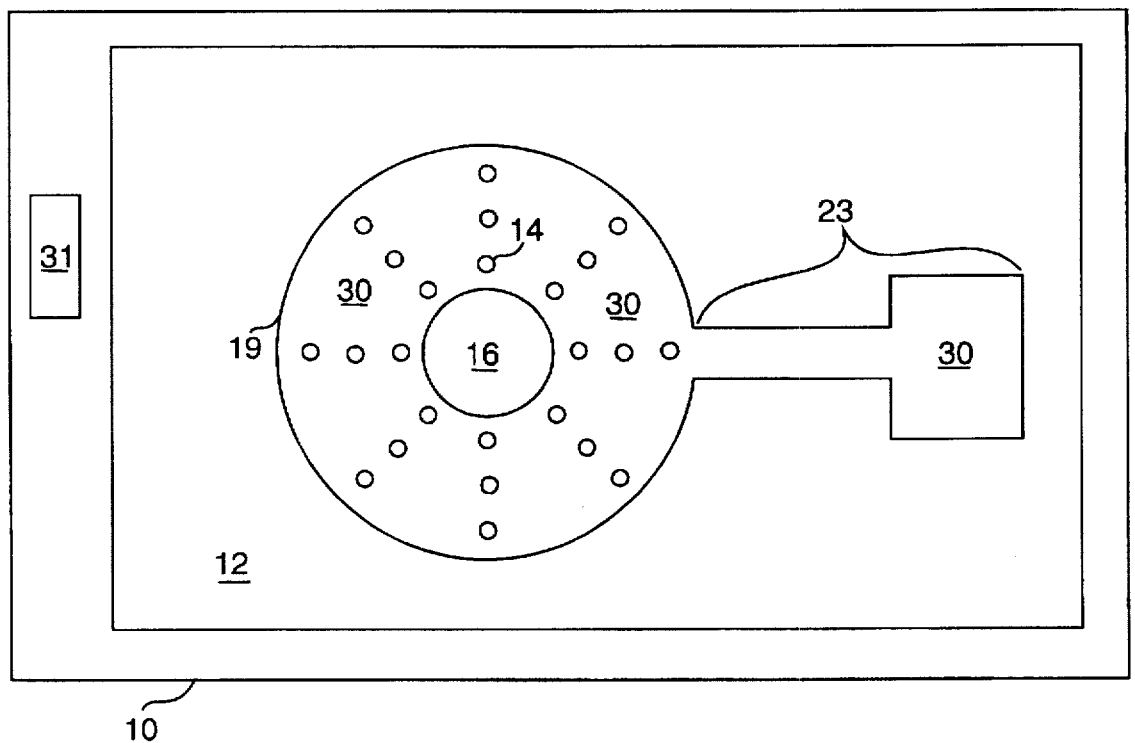
FIG. 17 is a top-view of the arrangement of FIG. 16 showing the patterned conductive layer.

The conductive layer 30 preferably extends beyond the membrane 15 to a region 23, as illustrated in FIG. 17. The controlled voltage source 29 is preferably electrically connected to the conductive layer 30 in the region 23. It will be appreciated that the region 23 may be patterned into any suitable shape. A contact 31 for electrically connecting the substrate 10 to the controlled voltage source 29 can be deposited and patterned on the substrate during the deposition and patterning of the conductive layer 30.

To form the gap 20, the rapidly-etchable layer 42 and LOCOS oxide 40 underlying the membrane 15 must be removed. This step is referred to as a "release" etch, since the membrane 15 is released, i.e., free to move, after the underlying layers are removed. If the rapidly-etchable layer 42 is formed from one of the preferred glasses, then the etch is preferably HF, BHF, or dilute versions of HF and BHF. These preferred etching vehicles may attack other features of the modulator, such as the conductive layer 30, and the membrane 15, depending upon the materials chosen and the amount of time spent in the etch bath. A protective layer of photoresist is preferably deposited on the conductive layer 30, however, photoresist will lift from the underlying material in HF or even in BHF during longer etch times. As previously noted, degradation of the conductive layer 30 may be avoided by depositing and patterning the conductive layer 30 after the release etch.

It will be appreciated that an etch cannot be delivered to the layers underlying the membrane 15 of the present modulator in the same manner as for modulators having membranes supported by support arms. In particular, there is usually a sufficient amount of open area between the support arms of typical modulators so that etches can be delivered to layers underlying the membrane. In the present modulator, however, the membrane 15 completely covers the optical cavity. Thus, etch must be delivered to the layers underlying the membrane in a different manner. In one embodiment of the present invention, etch is delivered to the underlying layers via the holes 14 in the membrane 15. Other techniques or means for delivering the etch, such as holes through other layers, depending upon modulator configuration, may suitably be used.

Figure 18A:
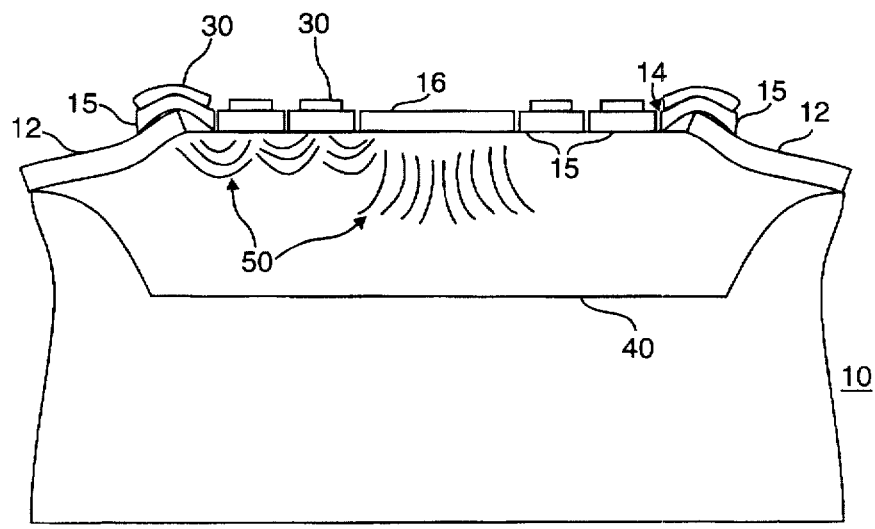
FIG. 18a is an illustration of the oxidized substrate being etched in an embodiment wherein the rapidly-etchable layer was not deposited on the oxidized substrate.
Figure 18B:
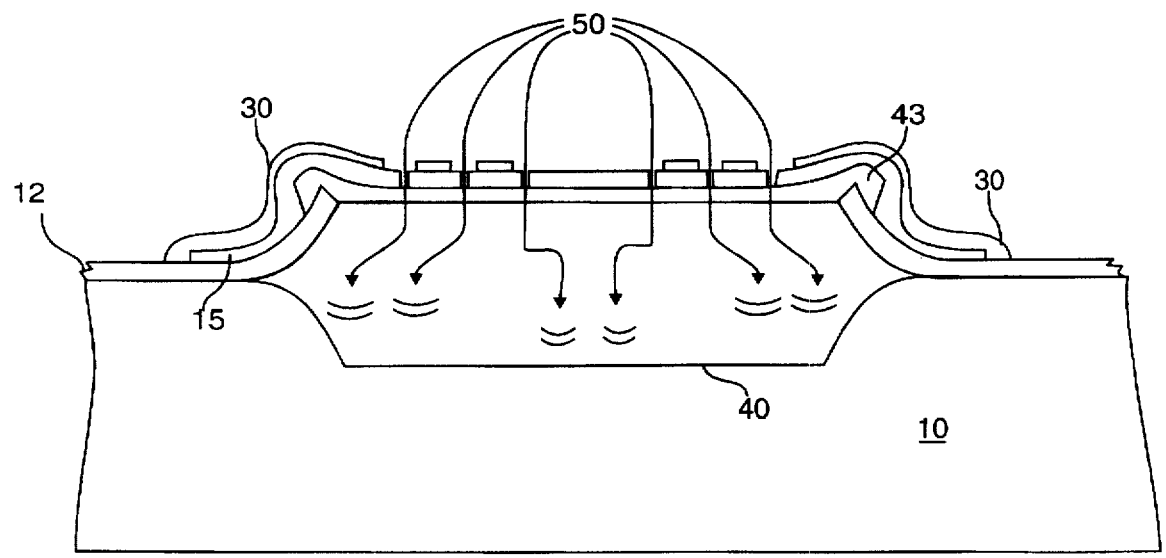
FIG. 18b is an illustration of the oxidized substrate being etched in the preferred embodiment wherein the rapidly-etchable layer was deposited on the oxidized substrate.
Figure 19:
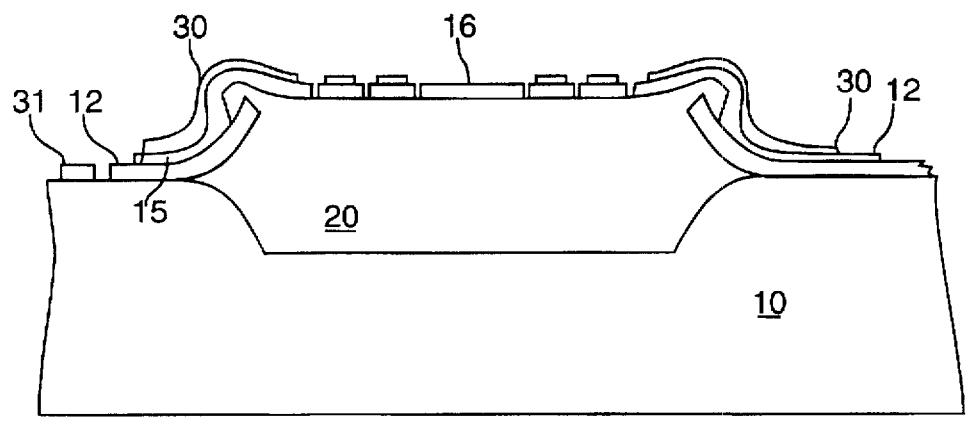
FIG. 19 shows the arrangement of FIG. 16 with the rapidly-etchable layer and the oxidized substrate removed, forming a modulator according to the present invention.

FIG. 18a is an illustration of a modulator being formed without the rapidly-etchable layer 42. The etch must proceed in a substantially lateral direction to remove the LOCOS oxide 40 from underneath the optical window portion of the membrane, since there are no holes in the optical window. As previously noted, the optical window may be as large as about 150 microns in diameter, so the modulator must remain in the etch for the time it takes to etch half of this diameter, since this region is being etched all around its perimeter. By placing a rapidly-etchable layer, such as the layer 42, beneath the membrane 15 and on top of the LOCOS oxide 40, a lateral conduit 43 is formed as the rapidly-etchable layer 42 is etched away. Thus, as shown in FIG. 18b, the etch can flow over the surface of the LOCOS oxide 40 and thus etch the LOCOS oxide in a substantially vertical direction. The gap, which is equivalent to the thickness of the LOCOS oxide 40 and the lateral conduit 43, will typically be much smaller than the diameter of the modulator cavity. For example, in one embodiment of a modulator, the gap 20 is preferably about one-quarter of the operating wavelength, or about 3300 angstroms. In another, the gap is about 1.1 micron. Thus, a vertically proceeding etch will remove the LOCOS oxide 40 in substantially less time than a laterally proceeding etch, resulting in less damage to permanent features of the modulator, such as the conductive layer 30 and the unprotected optical window. As the LOCOS oxide 40 is removed, the gap 20 is formed, as shown in FIG. 19.

The shape of the membrane 15 as it rises over the upturned edge of the layer 12 nearest the modulator cavity 21 imparts a "springiness" to the membrane 15. The shape of this region of the membrane 15 may be adjusted to impart more or less of such springiness to the membrane by adjusting the encroachment of the LOCOS oxide 40 under the layer 12. The encroachment of the LOCOS oxide 40 under the layer 12 can be controlled by variations in the LOCOS process that are known to those skilled in the art.

Figure 20:
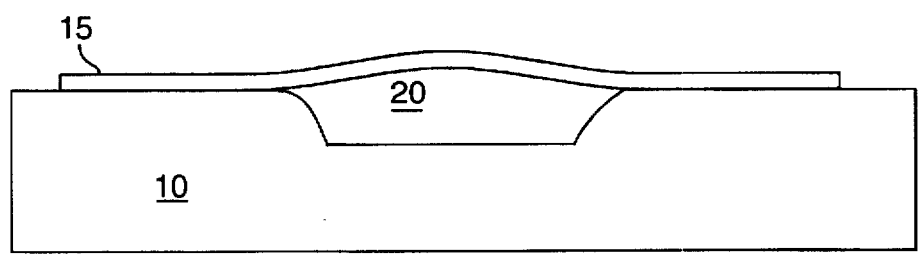
FIG. 20 is another embodiment of a modulator according to the present invention.
Figure 21:
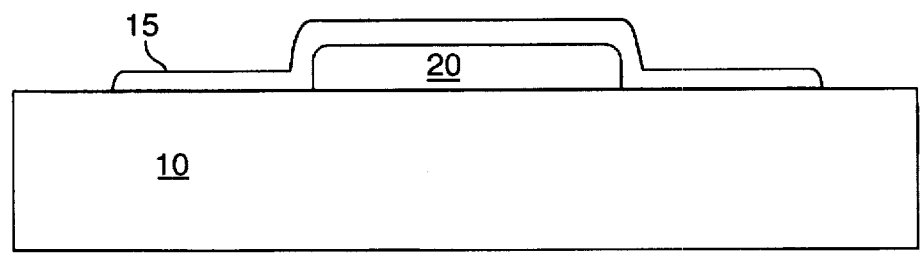
FIG. 21 is a further embodiment of a modulator according to the present invention.

It should be understood that the embodiments and variations shown and described herein are illustrative of the principles of this invention and that various modifications may occur to, and be implemented by, those skilled in the art without departing from the scope and spirit of the invention. For example, modulators according to the present invention can be formed without the cavity defining layer 12a. Embodiments of two such modulators are shown in FIGS. 20 and 21. In the embodiment shown in FIG. 20, a well is formed using milling or etching techniques, filled with an erodible material such as silicon dioxide or aluminum, a rapidly-etchable layer is deposited on the erodible material and patterned, and then a membrane layer is deposited on the rapidly-etchable layer and patterned. The underlying layers are removed via the previously described steps. In the embodiment of FIG. 21, an "island" of erodible material is deposited on a substrate and patterned, a rapidly-etchable layer is deposited on the erodible material and then patterned, and then a membrane layer is deposited and patterned. The underlying layers are removed as previously described.

The aformentioned embodiments of a method according to the present invention achieve precise control of the size, i.e., the width or diameter, of the modulator cavity. In other embodiments, however, the present method can be used for forming modulators wherein such precise control over the size of the modulator cavity is not desired. The steps of one such embodiment are illustrated in FIGS. 22-26.

Figure 22:
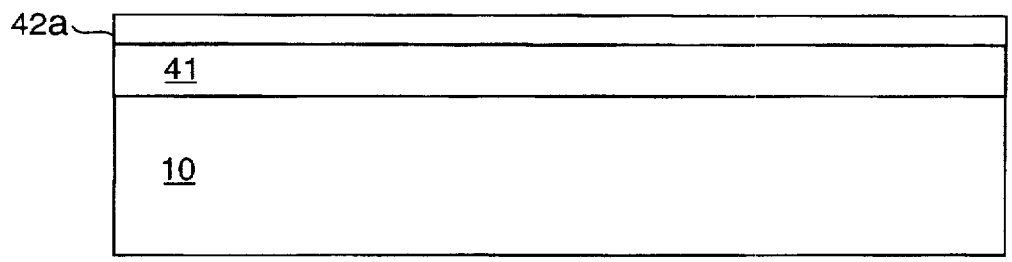
FIG. 22 shows an oxide layer and a rapidly-etchable layer disposed on a substrate in an additional embodiment of a method according to the present invention.

As shown in FIG. 22, an oxide layer 41 is deposited or grown on a substrate 10. In turn, a rapidly-etchable layer 42a is deposited or grown on the oxide layer 41. Note that in this embodiment, the oxide layer 41 is not a LOCOS oxide. Furthermore, in the previously described embodiments, the rapidly-etchable layer 42a was described to be a material that etches very rapidly compared to the LOCOS oxide 40. In the present embodiment, the material forming the rapidly-etchable layer 42a is one that it is attacked by an etch that will not attack the membrane 15 or oxide layer 41. Suitable materials include, without limitation, amorphous silicon and polycrystalline silicon.

Figure 23:
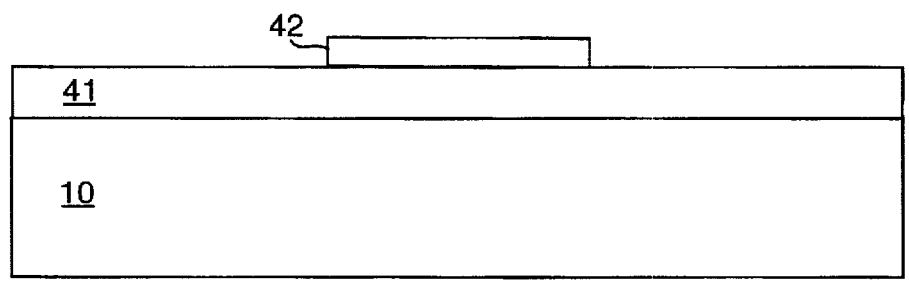
FIG. 23 shows the rapidly-etchable layer patterned into a shape suitable for forming a lateral conduit.
Figure 24:
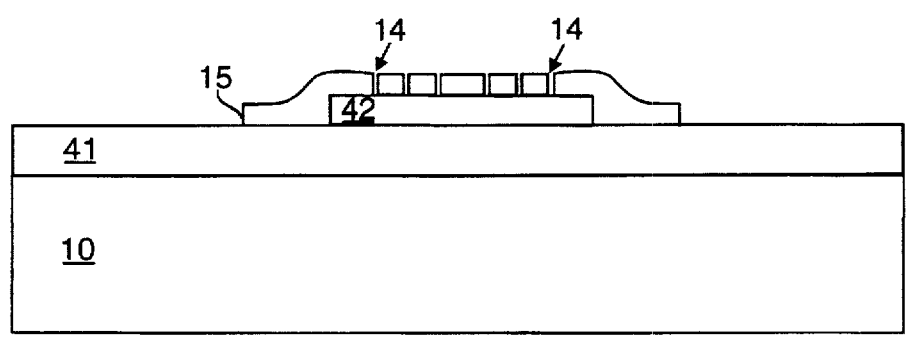
FIG. 24 shows a membrane layer disposed on the patterned rapidly-etchable layer.

The rapidly-etchable layer 42a is patterned as desired as shown in FIG. 23. The shape and lateral dimension of the patterned layer 42 will approximate the size of the resulting modulator cavity. As illustrated in FIG. 24, a membrane-forming layer 15a is deposited on the rapidly-etchable layer 42 and patterned. Again, it is not necessary to remove or pattern the membrane-forming layer 15a in the field. It is important, however, that holes 14 are patterned in the membrane if such holes are the way in which etch is delivered to the underlying layers. If required, a layer 30a of conductive material is deposited on the membrane 15 and patterned as previously described.

Figure 25:
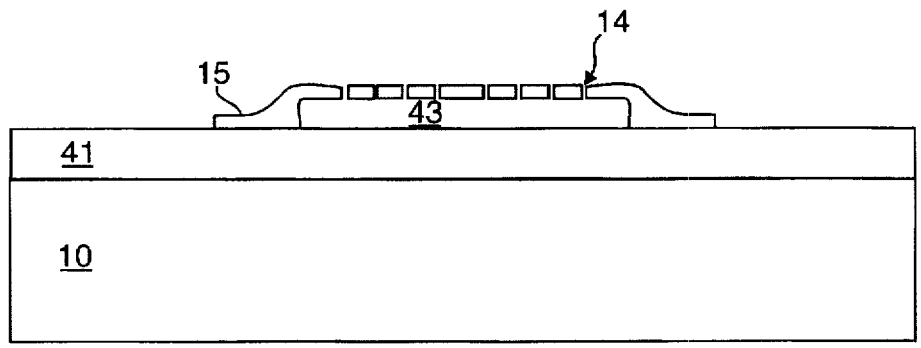
FIG. 25 is an illustration of a lateral conduit that is formed as the rapidly-etchable layer is removed.
Figure 26:
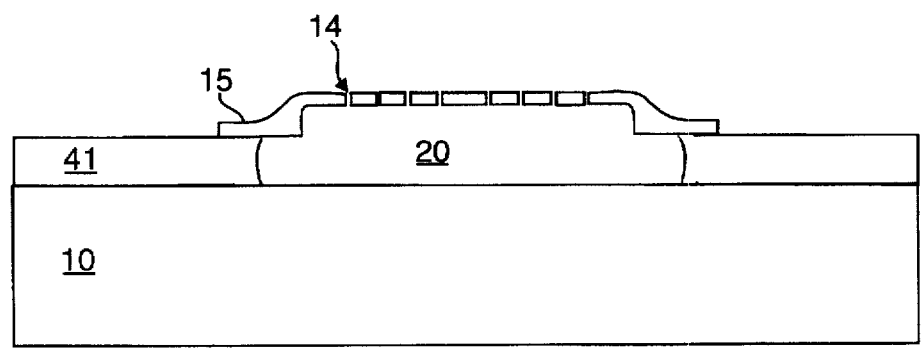
FIG. 26 shows the oxide layer removed resulting in a gap between the membrane and the substrate.

The nascent modulator is then placed in an etch suitable for etching the rapidly-etchable layer 42, which is preferably amorphous silicon or polycrystalline silicon in the present embodiment. Suitable etches include ethylene diamine pyrocatechol, or potassium hydroxide, or tetramethylhydrazine or a mixture of nitric acid, hydrofluoric acid and water. In appropriate concentrations known to those skilled in the art, such etches will attack the layer 42 yet leave the membrane 15 and underlying oxide 41 substantially unetched. As the rapidly-etchable layer 42 is removed, a lateral conduit 43 is formed as shown in FIG. 25. The device is then placed in a second etch suitable for removing the oxide layer 41, such as the previously described HF-based etches. The gap 20 is formed as the oxide layer 41 is removed as shown in FIG. 26

In the embodiment described in FIGS. 7-19, the silicon surrounding the LOCOS oxide 40 functioned as an "etch stop". In the present embodiment, in the absence of such an etch stop, the membrane 15 will be somewhat "undercut" as the etch proceeds isotropically in a lateral direction under the membrane 15.

It will be appreciated that a glass such as those previously described is suitable for use as the rapidly-etchable layer 42a in the present embodiment. If so, the second etch step to remove the oxide layer 41 is not required, since the etch used to remove the glass will remove the oxide layer. Likewise, the embodiment illustrated in FIGS. 7-19 may use amorphous silicon or polycrystalline silicon for the rapidly-etchable layer. If so, a second etch to remove the LOCOS oxide 40 will be required.

Figure 27:
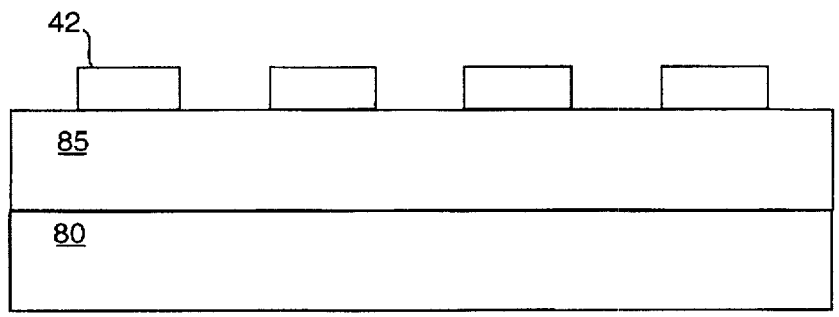
FIG. 27 shows a first and a second device layer and a rapidly-etchable material disposed on the second device layer, which material is patterned into discrete regions.
Figure 28:
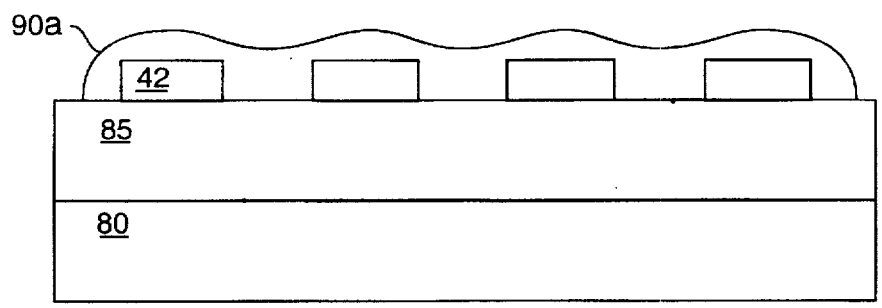
FIG. 28 shows a third device layer disposed on the regions of rapidly-etchable material.
Figure 29:
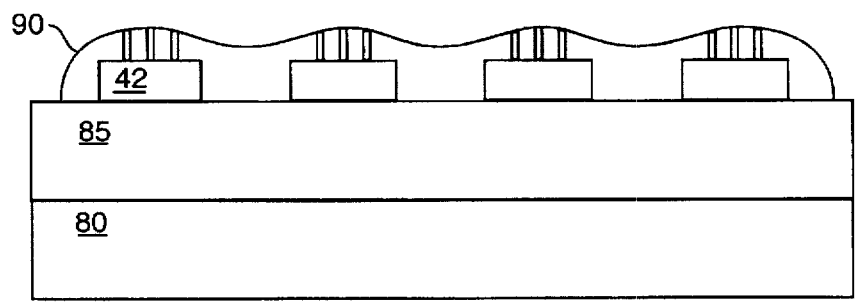
FIG. 29 shows holes patterned in the third device layer and lateral conduits formed as the regions of rapidly-etchable material are removed.
Figure 30:
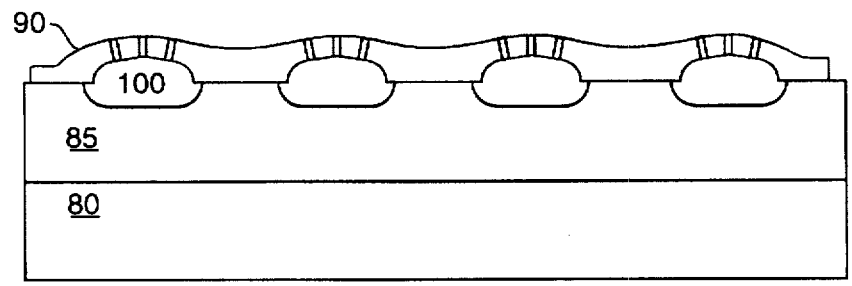
FIG. 30 shows gaps formed between the second and third device layer as a portion of the second device layer underneath each lateral conduit is etched.

The present invention may be modified in other ways, as well, a few of which are described below. In one modification, forming a lateral conduit utilizing a rapidly-etchable layer of material is applicable to fabricating other modulators or devices other than modulators wherein there is limited acess to a region that must be etched, especially if other features of such devices are vulnerable to attack while the region is being etched. For example, FIGS. 27-30 illustrate steps in a method according to the present invention for forming a structure other than a modulator. FIG. 27 shows two device layers 80 and 85, and a rapidly-etchable layer of material that has been patterned into four discrete regions 42. It will be appreciated that more or less device layers and more or less regions 42 of rapidly-etchable material can be utilized depending upon the nature of the structure being formed. A further layer 90a is deposited or grown on the regions 42, as illustrated in FIG. 28. FIG. 29 shows the layer 90a patterned into the layer 90. Such patterning includes, as a minimum, the formation of holes 95, if the holes are the means for delivering an etch to remove the regions 42. FIG. 29 further illustrates that lateral conduits 43 have been formed by etching away the regions 42. In FIG. 30, a portion of the device layer 85 beneath each lateral conduit 43 is removed by delivering an etch to the lateral conduits 43. Thus, a series of gaps 100 are formed in the structure. As previously described, the layer 85 may be etched using the same etch that was used to etch the regions 42, depending upon the material used for the rapidly-etchable layer.

In other modifications, the methods described herein are used for forming membranes having a shape other than the preferred circular shape, or materials other than those described herein may be used for fabricating the modulator.

We claim:

1. A monolithic micromechanical modulator for modulating an optical signal comprising:

a substrate characterized by a first refractive index; and a membrane for receiving an optical signal, wherein, the membrane has at least a first layer of material having a second refractive index that is approximately equal to the square root of the first refractive index of the substrate; wherein, the membrane is supported over a first region of the substrate, the first region having a perimeter defining a modulator cavity, wherein the membrane overlaps a substantial portion of the perimeter of the modulator cavity, and further wherein the substrate and membrane are monolithically integrated.

2. The modulator of claim 1 wherein the membrane is circular in shape.

3. The modulator of claim 1 wherein the membrane further comprises a plurality of holes physically adapted to damp vibration.

4. A monolithic micromechanical modulator for modulating an optical signal comprising:

a substrate; and a membrane for receiving an optical signal, the membrane having a plurality of holes physically adapted to damp vibration; wherein, the membrane is supported over a first region of the substrate, the first region having a perimeter defining a modulator cavity, wherein the membrane overlaps a substantial portion of the perimeter of the modulator cavity, and wherein the substrate and membrane are monolithically integrated, and further wherein the holes are spaced from each other and have a diameter such that the quality factor of the modulator ranges from about 0.7 to about 0.8.

5. The modulator of claim 4 wherein the modulator cavity is filled with gas and the holes are spaced from each other according to the expression $d=2[(Ph^2)/(12\pi\mu_{eff}f)]^{0.5}$, where P is the pressure of the gas, h is the size of the gap between the membrane and the substrate, f is the natural resonant frequency of the micromechanical modulator and $\mu_{eff}$ is effective gas viscosity, wherein, the effective gas viscosity is given by $\mu_{eff}=\mu/\{1+[6(2-\sigma)\lambda/\sigma h]\}$, where v is the accommodation coefficient and $\lambda$ is the mean-free-path of the gas.

6. The modulator of claim 4 wherein the holes have a diameter that is in the range of about two to about four times the size of the gap between the membrane and the substrate, and further wherein the diameter of the holes is a maximum of about one-third of the spacing between holes.

7. The modulator of claim 4 wherein the holes have a diameter in the range of about 2 microns to about 5 microns and are spaced from the nearest hole by about 10 to about 30 microns.

8. The modulator of claim 4 wherein the plurality of holes are located outside of the perimeter of a centrally located region of the membrane, which region defines an optical window for receiving the optical signal.

9. The modulator of claim 8 wherein the optical window ranges in diameter from about 25 to about 60 microns.

10. The modulator of claim 1 further comprising a conductive layer disposed on the membrane.

11. The modulator of claim 10 wherein the conductive layer is formed of a material selected from the group consisting of aluminum, gold, indium tin oxide, chromium/gold, titanium/gold, amorphous silicon, polycrystalline silicon and silicides.

12. The modulator of claim 4 wherein the membrane is circular in shape.

* * * * *